United States Patent
Lott

(10) Patent No.: US 7,694,147 B2
(45) Date of Patent: Apr. 6, 2010

(54) HASHING METHOD AND SYSTEM

(75) Inventor: David Robert Lott, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 1130 days.

(21) Appl. No.: 11/324,703

(22) Filed: Jan. 3, 2006

(65) Prior Publication Data

US 2007/0157028 A1 Jul. 5, 2007

(51) Int. Cl.
G06F 21/00 (2006.01)

(52) U.S. Cl. .................................. 713/183; 726/16
(58) Field of Classification Search ......... 713/182–183, 713/185; 726/2, 16–18, 21, 26–28
See application file for complete search history.

(56) References Cited

U.S. PATENT DOCUMENTS

| | | | | |
|---|---|---|---|---|
| 5,666,415 | A | * | 9/1997 | Kaufman .................... 713/159 |
| 6,182,229 | B1 | | 1/2001 | Nielsen |
| 6,370,250 | B1 | | 4/2002 | Stein |
| 6,470,454 | B1 | * | 10/2002 | Challener et al. ............. 726/17 |
| 6,601,175 | B1 | * | 7/2003 | Arnold et al. .................. 726/7 |
| 6,668,323 | B1 | * | 12/2003 | Challener et al. ........... 713/183 |
| 6,711,264 | B1 | * | 3/2004 | Matsumoto et al. ......... 380/283 |
| 6,748,544 | B1 | * | 6/2004 | Challener et al. ............. 726/17 |
| 6,883,095 | B2 | | 4/2005 | Sandhu et al. |

FOREIGN PATENT DOCUMENTS

WO WO 2004/040410 A2 5/2004

OTHER PUBLICATIONS

Reiter, et al.; A Security Architecture for Fault-Tolerant Systems; ACM Transactions on Computer Systems, vol. 12, No. 4, Nov. 1994; pp. 340-371; 1994 0734-2071/94/1100-0340.
Tsudik, et al.; On Simple and Secure Key Distribution; 1st Conf.—Computer & Comm. Security '93-Nov. 1993-VA, USA; pp. 49-57; 1993 ACM 0-89791-629-8/93/0011.
Boyarsky, Maurizio Kliban; Public-key Cryptography and Password Protocols: The Multi-User Case; CCS '99 Nov. 1999 Singapore; pp. 63-72; 1999 ACM 1-58113-148-8/99/0010. E-mail: mkboyarsky@yahoo.com.

* cited by examiner

*Primary Examiner*—Gilberto Barron, Jr.
*Assistant Examiner*—Shaun Gregory
(74) *Attorney, Agent, or Firm*—Schmeiser, Olsen & Watts; William E. Schiesser

(57) ABSTRACT

A hashing method and system. The method comprises receiving by a computing system, a user password. The computing system generates a first hash for the user password. The computing system generates a second hash for a system parameter and performs an operation relating the first hash to the second hash to generate a first combination value. The computing system generates a third hash for the first combination value. The computing system receives a specific password for requesting access to the computing system. The computing system generates a fourth hash for said specific password and performs an operation relating the fourth hash to the second hash to generate a second combination value. The computing system generates a fifth hash for the second combination value. The third hash is compared to the fifth hash to determine that the third hash matches the fifth hash. Access is enabled to the computing system.

49 Claims, 4 Drawing Sheets

HASHING METHOD AND SYSTEM

TECHNICAL FIELD

The present invention relates to a method and associated system for hashing a password.

BACKGROUND OF THE INVENTION

Preventing unauthorized users from accessing data within a system is typically not very secure thereby allowing the unauthorized users to access the data within the system. Therefore there exists a need for a secure means for preventing unauthorized users from accessing data within a system.

SUMMARY OF THE INVENTION

The present invention provides a method, comprising:
  receiving by a computing system, a user password, said user password for enabling access to a computing system;
  generating by said computing system, a first hash (H1) for said user password;
  storing said first hash (H1) within a memory device of said computing system;
  generating by said computing system, a second hash (H2) for a system parameter;
  storing said second hash (H2) within said memory device;
  performing by said computing system, an operation relating said first hash (H1) to said second hash (H2) to generate a first combination value;
  generating by said computing system, a third hash (H3) for said first combination value; and
  storing within said memory device, said third hash (H3).

The present invention provides a computing system comprising a processor and a computer readable memory unit coupled to the processor, said memory unit containing instructions that when executed by the processor implement a hashing method, said method comprising:
  receiving by said computing system, a user password, said user password for enabling access to said computing system;
  generating by said computing system, a first hash (H1) for said user password;
  storing said first hash (H1) within said memory unit;
  generating by said computing system, a second hash (H2) for a system parameter;
  storing said second hash (H2) within said memory unit;
  performing by said computing system, an operation relating said first hash (H1) to said second hash (H2) to generate a first combination value;
  generating by said computing system, a third hash (H3) for said first combination value; and
  storing within said memory unit, said third hash (H3).

The present invention provides a computer program product, comprising a computer usable medium having a computer readable program code embodied therein, said computer readable program code comprising an algorithm adapted to implement a hashing method within a computing system, said method comprising:
  receiving by said computing system, a user password, said user password for enabling access to said computing system;
  generating by said computing system, a first hash (H1) for said user password;
  storing said first hash (H1) within said computer usable medium;
  generating by said computing system, a second hash (H2) for a system parameter;
  storing said second hash (H2) within said computer usable medium;
  performing by said computing system, an operation relating said first hash (H1) to said second hash (H2) to generate a first combination value;
  generating by said computing system, a third hash (H3) for said first combination value; and
  storing within said computer usable medium, said third hash (H3).

The present invention provides a process for integrating computing infrastructure, comprising integrating computer-readable code into a computing system, wherein the computing system comprises a computer usable medium, and wherein the code in combination with the computing system is capable of performing a hashing method comprising:
  receiving by said computing system, a user password, said user password for enabling access to said computing system;
  generating by said computing system, a first hash (H1) for said user password;
  storing said first hash (H1) within said computer usable medium;
  generating by said computing system, a second hash (H2) for a system parameter;
  storing said second hash (H2) within said computer usable medium;
  performing by said computing system, an operation relating said first hash (H1) to said second hash (H2) to generate a first combination value;
  generating by said computing system, a third hash (H3) for said first combination value; and
  storing within said computer usable medium, said third hash (H3).

The present invention advantageously provides a secure means for preventing unauthorized users from accessing data within a system.

BEST MODE FOR CARRYING OUT THE INVENTION

Figure 1:
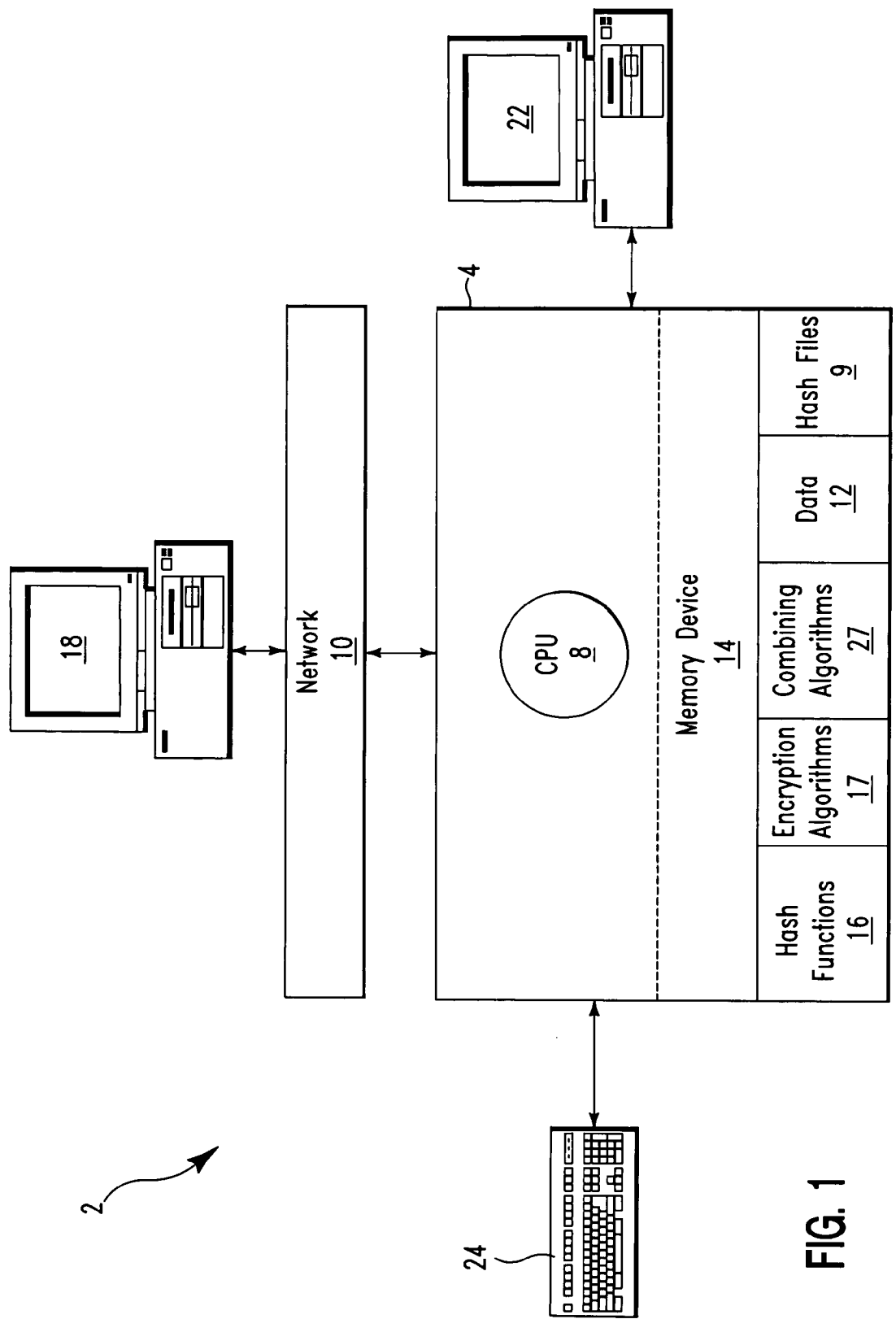
FIG. 1 illustrates a block diagram of a hashing system for generating and storing a secure password used to authenticate a user to enable access to a computing system, in accordance with embodiments of the present invention.

FIG. 1 illustrates a block diagram of a hashing system 2 for generating and storing a secure password used to authenticate a user to enable access to a computing system 4, in accordance with embodiments of the present invention. System 2 comprises computing system 4, an input terminal 18, an administrator terminal 22, a network 10, and an input means 24. Network 10 may comprise any type of network known to one skilled in the art including, inter alia, a local area network, (LAN), a wide area network (WAN), the Internet, etc. Input terminal 18 may comprise any type of computing apparatus including, inter alia, a personal computer (PC), a laptop computer, a personal digital assistant (PDA), etc. Administrator terminal 22 may comprise any type of computing apparatus including, inter alia, a personal computer (PC), a laptop computer, a PDA, etc. Input means 24 may comprise any type of input means including, inter alia, a keyboard a keypad, etc. Computing system 4 comprises a central processing unit (CPU) 8 and a memory device 14. The memory device 14 comprises hash functions 16 (i.e., hash algorithms), encryption algorithms 17, combining algorithms 27, data 12, and hash files 9. Data 12 may comprise private personal data 12 related to users including, inter alia, credit card information, bank account information, email account information, etc. Combining algorithms 27 may comprise any type of algorithms for combining hash values including, inter alia, an exclusive OR (XOR) algorithm, an appending algorithm, etc. Encryption algorithms 17 may comprise any encryption algorithm known to one skilled in the art including, inter alia, a cipher algorithm, a code algorithm, etc. A hash function is defined herein as a cryptographic one way mathematical function that receives as an input, a variable length input data message or string (e.g., a user password) and generates as an output, a secure fixed size output message or string (i.e., a secure mathematical representation of the password called a hash). The output message or string generated by the hash function is typically shorter than the variable length input data message or string. The variable length input may not be determined from the secure fixed size output message or string. Hash functions 16 may comprise, inter alia, cryptographic hash functions, etc. A cryptographic hash function is a hash function comprising additional (i.e., over a standard hash function) security properties making it suitable for use as a primitive in information security applications such as, inter alia, an authentication process, a message integrity process, etc. The hash function is used for securing a user password to prohibit unauthorized access to computing system 4 and data 12 within computing system 4. Hash functions 16 may comprise any type of hash functions known to one skilled in the art including, inter alia, SDH1, ND4, MD4, MD5, SHA1, RC4, etc. A hash function is applied to a hash input (e.g., a user password) to generate a hash output or value (herein referred to as a hash). A hash is defined herein as a hash output resulting from applying a hash function to a hash input. Hash files 9 includes any files comprising hashes for input parameters such as, inter alia, user passwords, system parameters, combination user and system passwords, etc. The hashes for the combination of user and system passwords are derived by performing an operation relating a hash(es) for a user password(s) to a hash (es) for a system parameter(s) as described, infra. A system parameter is defined herein as a parameter (or physical trait) related to computing system 4. For example, a system parameter may comprise, inter alia, a serial number for any hardware (e.g., CPU 8 serial number, memory device 14 serial number, etc.) within computing system 4, a serial number for any software on computing system 4 (e.g., a serial number for the operating system running on computing system 4), an administrator (i.e., for computing system 4) specified password, a message authentication code (MAC) address for computing system 4, etc.

Hashing system 2 allows a user wishing to enable access to computing system 4 and/or data 12 within computing system 4 to specify a user password. A user password may comprise any combination of alpha/numeric characters. Hashing system 2 generates a combination hash (i.e., a hashed combination of hashed input parameters such as, inter alia, user passwords, system parameters, etc) as described, infra. A user wishing to obtain access to computing system 4 and/or data 12 within computing system 4 specifies a user password and enters the user password into the computing system 4. The user password may be entered into the computing system 4 using input terminal 18 or input means 24. A first hash function of hash functions 16 is applied to the user password to generate a first hash. The first hash is stored in memory device 14. A system parameter (i.e., for computing system 4) is specified and a second hash function of hash functions 16 is applied to the system parameter to generate a second hash. The first hash function may comprise a same or different hash function as the second hash function. The second hash is stored in memory device 14. The system parameter may be specified by an administrator of computing system 4 and entered into computing system 4 through input terminal 18 or input means 24. Alternatively, the system parameter may be automatically specified by computing system 4. For example, computing system 4 may automatically obtain a serial number for its CPU 8 and use that serial number as the system parameter. Computing system 4 performs an operation relating the first hash (i.e., for the user password) to the second hash (i.e., for the system parameter) to generate a first combination value. A third hash function of hash functions 16 is applied to the first combination value to generate a third hash. Each of the first hash function, the second hash function and the third hash function may comprise a same or different hash function. As an alternative, a plurality of hash functions from hash functions 16 may be applied to a plurality of input parameters (e.g., multiple user passwords, multiple system parameters, etc.) to generate a plurality of hashes. Computing system 4 may perform an operation or multiple operations relating each of the plurality of hashes (e.g., a hash for the user password, a hash for a first system parameter, and a hash for a second system parameter) to each other to generate the first combination value. The first combination value may comprise the plurality of hashes in any order. For example, if there are four hashes to be combined (e.g., $1^{st}$ hash, $2^{nd}$ hash, $3^{rd}$ hash, and $4^{th}$ hash), the first combination value may comprise the hashes in any order such as, inter alia, ($1^{st}$ hash, $2^{nd}$ hash, $3^{rd}$ hash, $4^{th}$ hash), ($2^{nd}$ hash, $1^{st}$ hash, $4^{th}$ hash, $3^{rd}$ hash), ($4^{th}$ hash, $1^{st}$ hash, $2^{nd}$ hash, $3^{rd}$ hash), ($3^{rd}$ hash, $4^{th}$ hash, $1^{st}$ hash, $2^{nd}$ hash), etc. A third hash function of hash functions 16 is then applied to the first combination value to generate the third hash as described, supra. Additionally, the third hash may be encrypted to further prohibit unauthorized access to computing system 4. The third hash may be encrypted by using an encryption algorithm from encryption algorithms 17 to perform an encryption process on the third hash.

A first example for performing an operation relating the first hash H1 to the second hash H2 and generating the third hash is described as follows:

The first hash H1 (i.e., for the user password) and the second hash H2 (i.e., for the system parameter) are combined by applying an XOR operation (i.e., algorithm or logic) to the first hash H1 and the second hash H2 to generate a computed XOR value H1 XOR H2 (i.e., the first combination value) for the first hash H1 and the second hash H2 (i.e., using an XOR algorithm or logic wherein the first hash H1 and the second hash H2 are inputs to the XOR algorithm or logic and the first combination value H1 XOR H2 is an output from the XOR algorithm or logic). The third hash function of hash functions 16 is then applied to the computed XOR value H1 XOR H2 (i.e., the first combination value) to generate the third hash.

A second example for performing an operation relating the first hash H1 to the second hash H2 and generating the third hash is described as follows:

The first hash H1 (i.e., for the user password) and the second hash H2 (i.e., for the system parameter) are combined by appending (i.e., concatenating) the first hash H1 to the second hash H2 to generate a combined value H1H2 or H2H1 (i.e., the first combination value) for the first hash H1 and the second hash H2 (i.e., using an appending algorithm wherein the first hash H1 and the second hash H2 are inputs to the appending algorithm and the first combination value H1H2 or H2H1 is an output from the appending algorithm). The third hash function of hash functions 16 is then applied to the computed combined value H1H2 or H2H1 (i.e., the first combination value) to generate the third hash.

An example for performing an operation relating a plurality of hashes to each other and generating the third hash is described as follows:

The first hash (i.e., for the user password), the second hash (i.e., for the system parameter), and an additional hash (i.e., generated for an additional system parameter by applying (i.e., as an input) the additional system parameter to an additional hash function of hash functions 16 to generate the additional hash) are combined by applying an XOR operation (i.e., algorithm) to the first hash, the second hash, and the additional hash to generate a computed XOR value (i.e., the first combination value) for the first hash, the second hash, and the additional hash (i.e., using an XOR algorithm or logic wherein the first hash, the second hash, and the additional hash are inputs to the XOR algorithm or logic and the first combination value is an output from the XOR algorithm or logic). The third hash function of hash functions 16 is then applied to the computed XOR value (i.e., the first combination value) to generate the third hash. Note that this example may comprise combing any number of hashes to generate the third hash.

In any of the above examples, the third hash may be encrypted to further prohibit unauthorized access to computing system 4. The third hash may be encrypted by using an encryption algorithm from encryption algorithms 17 to perform an encryption process on the third hash.

The third hash is stored in memory device 14 for use in a user authentication process. When the user wishes to request access to computing system 4 and/or private personal data 12 on computing system 4, he/she enters a password (e.g., the user password specified as described, supra). The password may be entered into the computing system 4 using input terminal 18 or input means 24. The first hash function of hash functions 16 is applied to the entered password to generate a fourth hash. The fourth hash may be stored in memory device 14. Computing system 4 retrieves the second hash (i.e., for the system parameter) from memory device 14. Computing system 4 performs an operation relating the fourth hash (i.e., for the password) to the second hash (i.e., for the system parameter) to generate a second combination value. As described supra, with respect to the first combination value, the second combination value may be generated by applying an XOR operation (i.e., algorithm) to the fourth hash and the second hash to generate a computed XOR value (i.e., the second combination value) for the fourth hash and the second hash (i.e., using an XOR algorithm or logic wherein the fourth hash and the second hash are inputs to the XOR algorithm or logic and the second combination value is an output from the XOR algorithm or logic). The third hash function of hash functions 16 is applied to the second combination value to generate a fifth hash. Alternatively, as described supra, with respect to the first combination value, the second combination value may be generated by appending (i.e., concatenating) the fourth hash to the second hash to generate a combined value (i.e., the second combination value) for the fourth hash and the second hash (i.e., using an appending algorithm wherein the fourth hash and the second hash are inputs to the appending algorithm and the second combination value is an output from the appending algorithm). The third hash function of hash functions 16 is then applied to the second combination value to generate the fifth hash. Computing system 4 retrieves the third hash from the memory device compares the third hash to the fifth hash to determine if they match (i.e., are the same). If the third hash comprises a same hash as the fifth hash, the user is allowed to access computing system 4 and/or data 12 within computing system 4. If the third hash does not comprise a same hash as the fifth hash, the user is denied access to computing system 4 and/or data 12 within computing system 4. Additionally, computing system 4 may encrypt the third hash to generate an encrypted third hash and encrypt the fifth hash to generate an encrypted fifth hash. The encrypted third hash may be compared to the encrypted fifth hash to determine if they match (i.e., are the same). If the encrypted third hash comprises a same hash as the encrypted fifth hash, the user is allowed to access computing system 4 and/or data 12 within computing system 4. If the encrypted third hash does not comprise a same hash as the encrypted fifth hash, the user is denied access to computing system 4 and/or data 12 within computing system 4.

An example for implementation of hashing system 2 (of FIG. 1) to generate and store a secure password used to authenticate a user to enable access to computing system 4 (of FIG. 1) is described as follows:

The example is described as a series of steps for generating and storing a hash and using the hash to authenticate a user to enable access to computing system 4.

Hash Generation Process

1. A system administrator configures a computer system (i.e., computer system 4) that requires user accounts for access to the computing system. Access to each account is protected by a password.

2. The system administrator begins by creating or specifying a system parameter as described, supra. The system parameter is a pointer that contains a unique system variable. The system parameter may comprise a hardware serial number, a daughter card or add on product serial number, an operating system license number, a MAC address for the computing system, a password created by the system administrator, etc. The system parameter will be used in a later step. In the example, a MAC address of the computing system will be used as the system parameter. The MAC address of the computing system is 0010DCECF225. The MAC address 0010DCECF225 is stored in a file called hashkey.txt.

3. User A wishing to create a user account (i.e., to access the computing system or files within the computing system) specifies a user name and user password. The specified user password is helpmelogin. The specified user password (helpmelogin) is stored in an ANSI text file called password.txt.

4. The computing system retrieves the password helpmelogin from password.txt and inputs the password helpmelogin into an MD5SUMS cryptographic security hash function (or algorithm) to generate as an output a first hash (i.e., a string of characters that represents the original password) called HASH-PASS. The first hash HASH-PASS comprises 6365fa1643b395442f8b418613985f7f.

5. The computing system retrieves the MAC address 0010DCECF225 from hashkey.txt and inputs the MAC address 0010DCECF225 into an MD5SUMS cryptographic security hash function (or algorithm) to generate as an output a second hash (i.e., a string of characters that represents the MAC address) called HASH-KEY. The second hash HASH-KEY comprises D7360eed8c3b4745ff10f8c46320e299. Note that the cryptographic security hash function used in step 5 does not have to comprise a same cryptographic security hash function as the cryptographic security hash function used in step 4.

6. The computing system then combines HASH-PASS (6365fa1643b395442f8b418613985f7f) and HASH-KEY (D7360eed8c3b4745ff10f8c46320e299) generate a first combined value by appending (i.e., concatenating) HASH-PASS to HASH-KEY (i.e., by using an appending algorithm wherein the first hash (HASH-PASS) and the second hash (HASH-KEY) are inputs to an appending algorithm and the first combined value is an output from the appending algorithm. The first combined value is called HASH-SUM and comprises D7360eed8c3b4745ff10f8c46320e2996365fa1643b395442f8b418613985f7f. The first combined value HASH-SUM is placed in a file called hash-sum.txt.

7. The computing system retrieves first combined value HASH-SUM (D7360eed8c3b4745ff10f8c46320e2996365fa1643b395442f8b418613985f7f) from hash-sum.txt and inputs the first combined value HASH-SUM into an MD5SUMS cryptographic security hash function (or algorithm) to generate as an output a third hash (i.e., a string of characters that represents first combined value HASH-SUM) called HASH-FINAL. The third hash HASH-FINAL comprises bac321bd4e67306080d8f3bdf29d6d. The third hash HASH-FINAL is placed in a file called FILE-PASS.

User Login Process

8. When the user A desires to log into the computing system, a login request is sent to the computing system and the computing system responds by requesting a username and password. This communication process may be accomplished via a number of exchange protocols such as, inter alia, CHAP, PAP and others.

9. User A enters a user name and password into the computing system.

10. When the computing system receives the username and password, it performs a look up function against the stored password file, FILE-PASS.

11. The computing system extracts from FILE-PASS, the third hash HASH-FINAL (bac321bd4e67306080d8f3bdf29d6d) associated with user A.

12. The computing system then uses the password supplied by user A as input to the MD5SUMS cryptographic security hash function (or algorithm) to generate as an output a fourth hash called HASH-LOGIN. In each of steps 12, 14, 15, and 16 two password scenarios will be given: an incorrect password scenario denoted by suffix a and a correct password scenario denoted by suffix b.

12a. An incorrect password (letmein) is entered: The incorrect password (letmein) is used as input for the MD5SUMS hash function which returns a hash called HASHLOGIN1 comprising: 0d107d09f5bbe40cade3de5c71e9e9b7.

12b. A correct password (helpmelogin) is entered: The correct password (helpmelogin) is used as input for the MD5SUMS hash function which a hash called HASHLOGIN2 comprising: 6365fa1643b395442f8b418613985f7f.

13. As with step 5, the computing system retrieves the MAC address 0010DCECF225 from hashkey.txt and inputs the MAC address 0010DCECF225 into the MD5SUMS cryptographic security hash function (or algorithm) to generate as an output the second hash (i.e., a string of characters that represents the MAC address) called HASH-KEY. The second hash HASH-KEY comprises D7360eed8c3b4745ff10f8c46320e299.

14. The computing system then combines the hash of the entered password and HASH-KEY to generate a second combined value HASH-CHECK.

14a. The incorrect password (letmein) was entered: The computing system combines HASHLOGIN1 and second hash HASH-KEY to generate a second combined value by appending (i.e., concatenating) HASH-LOGIN1 to HASH-KEY (i.e., by using an appending algorithm wherein the hash HASH-LOGIN1 and HASH-KEY are inputs to an appending algorithm and the first combined value is an output from the appending algorithm). The combined value is called HASH-CHECK1 and comprises D7360eed8c3b4745ff10f8c46320e2990d107d09f5bbe40cade3de5c71e9e9b7.

14b. The correct password (helpmelogin) was entered: The computing system combines HASHLOGIN2 and second hash HASH-KEY to generate a second combined value by appending HASH-LOGIN2 to HASH-KEY (i.e., by using an appending algorithm wherein the hash HASH-LOGIN2 and HASH-KEY are inputs to an appending algorithm and the first combined value is an output from the appending algorithm. The combined value is called HASH-CHECK2 and comprises D7360eed8c3b4745ff10f8c46320e2996365fa1643b395442f8b418613985f7f.

15. The computing system inputs the second combined value HASH-CHECK into an MD5SUMS cryptographic security hash function (or algorithm) to generate an output called HASHCHECK-FINAL.

15a. The incorrect password (letmein) was entered: The computing system inputs the second combined value HASH-CHECK1 into the MD5SUMS cryptographic security hash function (or algorithm) to generate a hash output called HASHCHECK-FINAL1 comprising the value 6b1d9dbb12b20ac735dbdb9afe40976e.

15b. The correct password (letmein) was entered: The computing system inputs the second combined value HASH-CHECK2 into the MD5SUMS cryptographic security hash function (or algorithm) to generate a hash output called HASHCHECK-FINAL2 comprising the value bac321bd4e67306080d8f3bdf29d6d.

16. The computing system compares the value for HASH-FINAL to the value for HASHCHECK-FINAL to determine if a login is allowed.

16a. The incorrect password (letmein) was entered: The computing system compares the value for HASH-FINAL (bac321bd4e67306080d8f3bdf29d6d) to the value for HASHCHECK-FINAL1 (6b1d9dbb12b20ac735dbdb9afe40976e) and determines that: 6b1d9dbb12b20ac735dbdb9afe40976e≠bac321bd4e67306080d8f3bdf29d6d. Therefore user A cannot login to the computing system.

16b. The correct password (helpmelogin) was entered: The computing system compares the value for HASH-FINAL (bac321bd4e67306080d8f3bdf29d6d) to the value for HASHCHECK-FINAL2 (bac321bd4e67306080d8f3bdf29d6d) and determines that: bac321bd4e67306080d8f3bdf29d6d=bac321bd4e67306080d8f3bdf29d6d. Therefore user A is able to login to the computing system.

Figure 2:
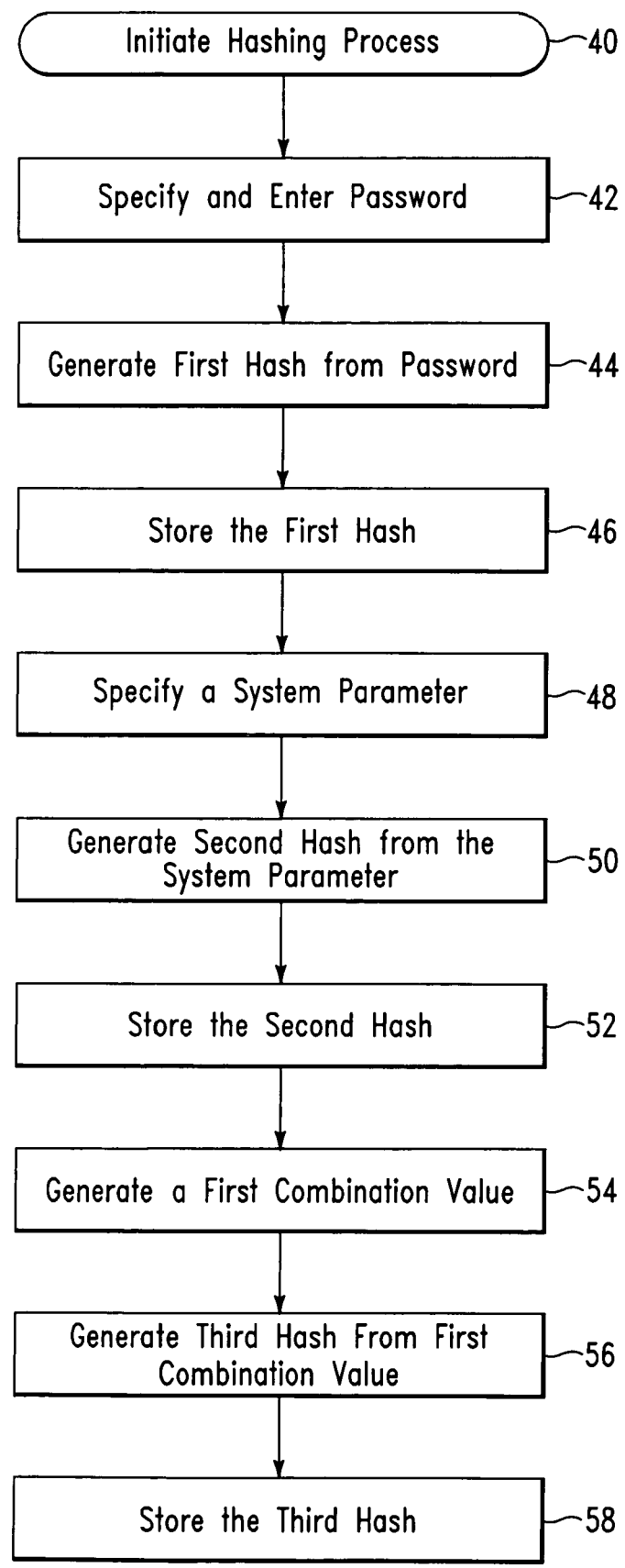
FIG. 2 illustrates a flowchart describing an algorithm for generating and storing a secure password used to authenticate a user to enable access to the computing system of FIG. 1, in accordance with embodiments of the present invention.

FIG. 2 illustrates a flowchart describing an algorithm for generating and storing a hash used to authenticate a user to enable access to computing system 4 of FIG. 1, in accordance with embodiments of the present invention. In step 40, a hashing process is initiated. In step 42, a user wishing to create a password for enabling access to computing system 4 and/or data 12 within computing system 4, specifies a user password and enters the specified user password into computing system 4. In step 44, a first hash function of hash functions 16 is applied to the specified user password to generate a first hash as described, supra with respect to FIG. 1. In step 46, the first hash is stored in memory device 14. In step 48, a system parameter (i.e., for computing system 4) is selected as described, supra with respect to FIG. 1. In step 50, a second hash function of hash functions 16 is applied to the system parameter to generate a second hash as described, supra with respect to FIG. 1. In step 52, the second hash is stored in memory device 14. In step 54, computing system 4 performs an operation relating the first hash (i.e., for the user password) to the second hash (i.e., for the system parameter) to generate a first combination value. In step 56, computing system 4 generates a third hash by applying the first combination value to a third hash function of hash functions 16. As described, supra, the first hash (i.e., for the user password) and the second hash (i.e., for the system parameter) may be combined by applying an XOR operation to the first hash and the second hash, (i.e., using an XOR algorithm or logic wherein the first hash and the second hash are inputs to the XOR algorithm or logic and the first combination value is an output from the XOR algorithm or logic) thereby generating a computed XOR value (i.e., the first combination value) for the first hash and the second hash. The computed XOR value (i.e., the first combination value) is then applied to (i.e., as an input) to the third hash function of hash functions 16 to generate the third hash. Alternatively as described, supra, the first hash (i.e., for the user password) and the second hash (i.e., for the system parameter) may be combined by appending the first hash to the second hash (i.e., using an appending algorithm wherein the first hash and the second hash are inputs to the appending algorithm or logic and the first combination value is an output from the appending algorithm or logic) thereby generating a combined value (i.e., the first combination value) for the first hash and the second hash. The third hash function of hash functions 16 is applied to the computed combined value (i.e., the first combination value) to generate the third hash. In step 58, the third hash is stored in memory device 14 for use in the user authentication process described, infra, with respect to FIG. 3.

Figure 3:
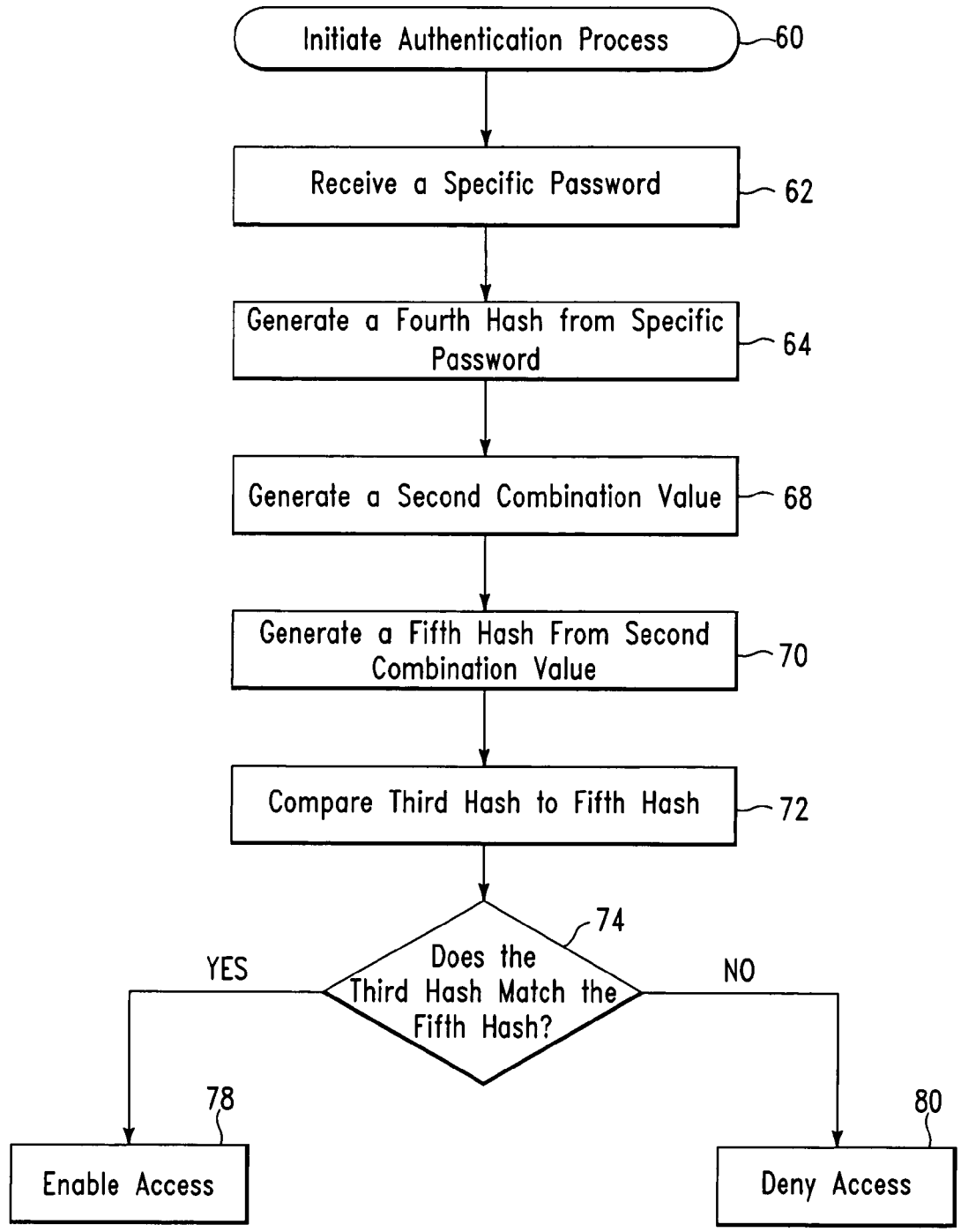
FIG. 3 illustrates a flowchart describing an algorithm for authenticating a user to enable access to the computing system of FIG. 1, in accordance with embodiments of the present invention.

FIG. 3 illustrates a flowchart describing an algorithm for authenticating a user to enable access to computing system 4 of FIG. 1, in accordance with embodiments of the present invention. In step 60, the user authentication process is initiated. In step 62, the user wishing to request access to computing system 4 and/or private personal data 12 on computing system 4, enters a user password (e.g., the user password specified as described with respect to FIG. 2, supra). In step 64, the first hash function of hash functions 16 is applied to the user password to generate a fourth hash as described, supra with respect to FIG. 1. The fourth hash may be and stored in memory device 14. In step 68, the second hash (i.e., generated in step 50 of FIG. 2) is retrieved from memory device 14 and computing system 4 performs an operation relating the fourth hash (i.e., for the user password entered in step 60) to the second hash to generate a second combination value. As described supra in the description of FIG. 2, with respect to the first combination value, the second combination value may be generated by the use of an XOR algorithm, an appending algorithm, etc. In step 70, computing system 4 applies the third hash function of hash functions 16 to the second combination value to generate the fifth hash. In step 72, computing system 4 compares the third hash generated in FIG. 2 to the fifth hash. In step 74, computing system 4 determines if the third hash matches the fifth hash. If in step 74, the third hash matches the fifth hash, then in step 78 the user is allowed to access computing system 4 and/or data 12 within computing system 4. If in step 74, the third hash does not match the fifth hash, then in step 80 the user is denied access to computing system 4 and/or data 12 within computing system 4.

Figure 4:
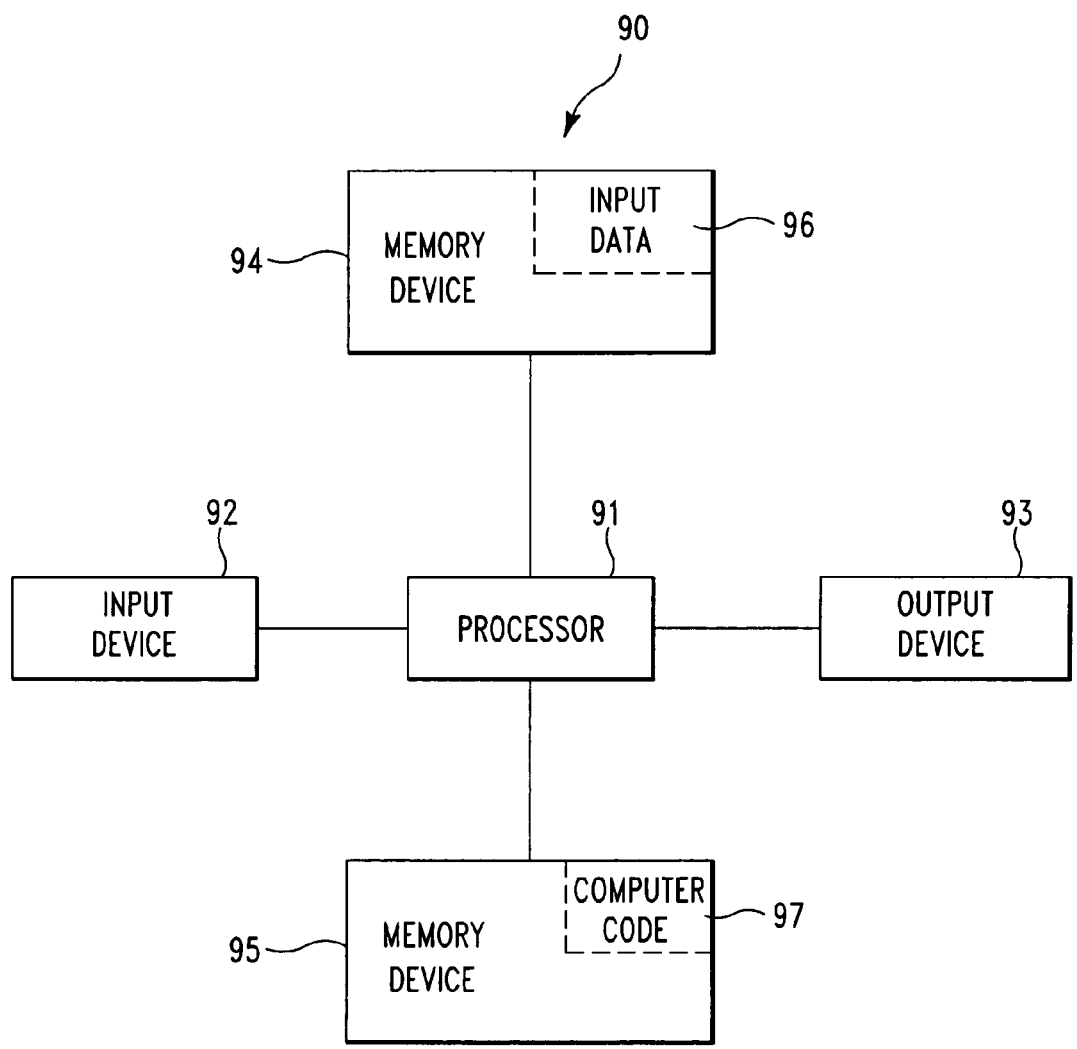
FIG. 4 illustrates a computer system used for implementing the computing system of FIG. 1 to generate and store a secure password, in accordance with embodiments of the present invention.

FIG. 4 illustrates a computer system 90 used for implementing the computing system 4 of FIG. 1 to generate and store a secure password, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., a monitor), a magnetic tape, a removable hard disk, a floppy disk, etc. The memory devices 94 and 95 may be used to implement memory device 14 of FIG. 1. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for generating a secure password to authenticate a user. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIG. 2 and/or FIG. 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for generating a secure password to authenticate a user.

While FIG. 4 shows the computer system 90 as a particular configuration of hardware and software, any configuration of hardware and software, as would be known to one skilled in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
   receiving by a computing system, a user password, said user password for enabling access to a computing system;
   generating by said computing system, a first hash (H1) for said user password;

storing said first hash (H1) within a memory device of said computing system;

generating by said computing system, a second hash (H2) for only a system parameter, wherein said system parameter consists of a parameter for a hardware component of said computing system;

storing said second hash (H2) within said memory device;

generating by said computing system, an additional hash for only an additional system parameter, wherein said additional system parameter consists of a parameter for a software component of said computing system;

performing by said computing system, an operation relating said first hash (H1) to said second hash (H2) and said additional hash to generate a first combination value;

generating by said computing system, a third hash (H3) for said first combination value;

storing within said memory device, said third hash (H3);

receiving by said computing system, a specific password for requesting access to said computing system;

generating by said computing system, a fourth hash (H4) for said specific password;

performing by said computing system, an operation relating said fourth hash (H4) to said second hash (H2) and said additional hash to generate a second combination value;

generating by a computer processor of said computing system, a fifth hash (H5) for said second combination value;

comparing by said computing system, said third hash (H3) to said fifth hash (H5);

Determining as a result of said comparing, that said third hash (H3) matches said fifth hash (H5); and Enabling access to said computing system.

2. The method of claim 1, further comprising:

comparing by said computing system, said third hash (H3) to said fifth hash (H5);

determining as a result of said comparing, that said third hash (H3) does not match said fifth hash (H5); and denying access to said computing system.

3. The method of claim 1, further comprising:

encrypting by said computing system, said third hash (H3) to generate an encrypted third hash; and encrypting by said computing system, said fifth hash (H5) to generate an encrypted fifth hash.

4. The method of claim 3, further comprising:

comparing by said computing system, said encrypted third hash to said encrypted fifth hash;

determining as a result of said comparing, that said encrypted third hash matches said encrypted fifth hash; and enabling access to said computing system.

5. The method of claim 3, further comprising:

comparing by said computing system, said encrypted third hash to said encrypted fifth hash;

determining as a result of said comparing, that said encrypted third hash does not match said encrypted fifth hash; and denying access to said computing system.

6. The method of claim 1, wherein said performing said operation relating said first hash (H1) to said second hash (H2) comprises XORing said first hash (H1) and said second hash (H2) to form H1 XOR H2 as said first combination value.

7. The method of claim 1, wherein said performing said operation relating said first hash (H1) to said second hash (H2) comprises concatenating said first hash (H1) to said second hash (H2) to form H1H2 as said first combination value.

8. The method of claim 1, wherein said performing said operation relating said said first hash (H1) to said second hash (H2) comprises concatenating said first hash (H1) to said second hash (H2) to form H2H1 as said first combination value.

9. The method of claim 1, wherein said generating said first hash (H1) comprises applying as an input to a first hash function said user password to generate said first hash (H1), wherein said generating said second hash (H2) comprises applying as an input to a second hash function said system parameter to generate said second hash (H2), wherein said generating said third hash (H3) comprises applying as an input to a third hash function said first combination value to generate said third hash (H3), and wherein said generating said additional hash comprises applying as an input to an additional hash function said additional system parameter to generate said additional hash.

10. The method of claim 9, wherein said first hash function, said second hash function, said additional hash function, and said third hash function each comprise a different hash function.

11. A computing system comprising a computer processor and a computer readable memory unit coupled to the computer processor, said memory unit containing instructions that when executed by the computer processor implement a hashing method, said method comprising:

receiving by said computing system, a user password, said user password for enabling access to said computing system;

generating by said computing system, a first hash (H1) for said user password;

storing said first hash (H1) within said memory unit;

generating by said computing system, a second hash (H2) for a system parameter, wherein said system parameter consists of a parameter for a hardware component of said computing system;

storing said second hash (H2) within said memory unit;

generating by said computing system, an additional hash for only an additional system parameter, wherein said additional system parameter consists of a parameter for a software component of said computing system;

performing by said computing system, an operation relating said first hash (H1) to said second hash (H2) and said additional hash to generate a first combination value;

generating by said computing system, a third hash (H3) for said first combination value;

storing within said memory unit, said third hash (H3);

receiving by said computing system, a specific password for requesting access to said computing system;

generating by said computing system, a fourth hash (H4) for said specific password;

performing by said computing system, an operation relating said fourth hash (H4) to said second hash (H2) and said additional hash to generate a second combination value;

generating by said computer processor, a fifth hash (H5) for said second combination value;

comparing by said computing system, said third hash (H3) to said fifth hash (H5);

Determining as a result of said comparing, that said third hash (H3) matches said fifth hash (H5); and Enabling access to said computing system.

12. The computing system of claim 11, wherein said method further comprises:

comparing by said computing system, said third hash (H3) to said fifth hash (H5);
determining as a result of said comparing, that said third hash (H3) does not match said fifth hash (H5); and
denying access to said computing system.

13. The computing system of claim 11, wherein said method further comprises:
encrypting by said computing system, said third hash (H3) to generate an encrypted third hash; and
encrypting by said computing system, said fifth hash (H5) to generate an encrypted fifth hash.

14. The computing system of claim 13, wherein said method further comprises:
comparing by said computing system, said encrypted third hash to said encrypted fifth hash;
determining as a result of said comparing, that said encrypted third hash matches said encrypted fifth hash; and
enabling access to said computing system.

15. The computing system of claim 13, wherein said method further comprises:
comparing by said computing system, said encrypted third hash to said encrypted fifth hash;
determining as a result of said comparing, that said encrypted third hash does not match said encrypted fifth hash; and
denying access to said computing system.

16. The computing system of claim 11, wherein said performing said operation relating said first hash (H1) to said second hash (H2) comprises XORing said first hash (H1) and said second hash (H2) to form H1 XOR H2 as said first combination value.

17. The computing system of claim 11, wherein said performing said operation relating said first hash (H1) to said second hash (H2) comprises concatenating said first hash (H1) to said second hash (H2) to form H1H2 as said first combination value.

18. The computing system of claim 11, wherein said performing said operation relating said first hash (H1) to said second hash (H2) comprises concatenating said first hash (H1) to said second hash (H2) to form H2H1 as said first combination value.

19. The computing system of claim 11, wherein said generating said first hash (H1) comprises applying as an input to a first hash function said user password to generate said first hash (H1), wherein said generating said second hash (H2) comprises applying as an input to a second hash function said system parameter to generate said second hash (H2), and wherein said generating said third hash (H3) comprises applying as an input to a third hash function said first combination value to generate said third hash (H3), and wherein said generating said additional hash comprises applying as an input to an additional hash function said additional system parameter to generate said additional hash.

20. The computing system of claim 19, wherein said first hash function, said second hash function, said additional hash function and said third hash function each comprise a different hash function.

21. A computer program product, comprising a computer usable medium having a computer readable program code embodied therein, said computer readable program code comprising an algorithm adapted to implement a hashing method within a computing system, said method comprising:
receiving by said computing system, a user password, said user password for enabling access to said computing system;
generating by said computing system, a first hash (H1) for said user password;
storing said first hash (H1) within said computer usable medium;
generating by said computing system, a second hash (H2) for a system parameter, wherein said system parameter consists of a parameter for a hardware component of said computing system;
storing said second hash (H2) within said computer usable medium;
generating by said computing system, an additional hash for only an additional system parameter, wherein said additional system parameter consists of a parameter for a software component of said computing system;
performing by said computing system, an operation relating said first hash (H1) to said second hash (H2) and said additional hash to generate a first combination value;
generating by said computing system, a third hash (H3) for said first combination value;
storing within said computer usable medium, said third hash (H3);
receiving by said computing system, a specific password for requesting access to said computing system;
generating by said computing system, a fourth hash (H4) for said specific password;
performing by said computing system, an operation relating said fourth hash (H4) to said second hash (H2) and said additional hash to generate a second combination value;
generating by a computer processor of said computing system, a fifth hash (H5) for said second combination value;
comparing by said computing system, said third hash (H3) to said fifth hash (H5);
Determining as a result of said comparing, that said third hash (H3) matches said fifth hash (H5); and
Enabling access to said computing system.

22. The computer program product of claim 21, wherein said method further comprises:
comparing by said computing system, said third hash (H3) to said fifth hash (H5);
determining as a result of said comparing, that said third hash (H3) does not match said fifth hash (H5); and
denying access to said computing system.

23. The computer program product of claim 21, wherein said method further comprises:
encrypting by said computing system, said third hash (H3) to generate an encrypted third hash; and
encrypting by said computing system, said fifth hash (H5) to generate an encrypted fifth hash.

24. The computer program product of claim 23, wherein said method further comprises:
comparing by said computing system, said encrypted third hash to said encrypted fifth hash;
determining as a result of said comparing, that said encrypted third hash matches said encrypted fifth hash; and
enabling access to said computing system.

25. The computer program product of claim 23, wherein said method further comprises:
comparing by said computing system, said encrypted third hash to said encrypted fifth hash;
determining as a result of said comparing, that said encrypted third hash does not match said encrypted fifth hash; and
denying access to said computing system.

26. The computer program product of claim 21, wherein said performing said operation relating said first hash (H1) to said second hash (H2) comprises XORing said first hash (H1) and said second hash (H2) to form H1 XOR H2 as said first combination value.

27. The computer program product of claim 21, wherein said performing said operation relating said first hash (H1) to said second hash (H2) comprises concatenating said first hash (H1) to said second hash (H2) to form H1H2 as said first combination value.

28. The computer program product of claim 21, wherein said performing said operation relating said first hash (H1) to said second hash (H2) comprises concatenating said first hash (H1) to said second hash (H2) to form H2H1 as said first combination value.

29. The computer program product of claim 21, wherein said generating said first hash (H1) comprises applying as an input to a first hash function said user password to generate said first hash (H1), wherein said generating said second hash (H2) comprises applying as an input to a second hash function said system parameter to generate said second hash (H2), wherein said generating said third hash (H3) comprises applying as an input to a third hash function said first combination value to generate said third hash (H3), and wherein said generating said additional hash comprises applying as an input to an additional hash function said additional system parameter to generate said additional hash.

30. The computer program product of claim 29, wherein said first hash function, said second hash function, said additional hash function and said third hash function each comprise a different hash function.

31. A process for integrating computing infrastructure, comprising integrating computer-readable code into a computing system, wherein the computing system comprises a computer usable medium, and wherein the code in combination with the computing system is capable of performing a hashing method comprising:
   receiving by said computing system, a user password, said user password for enabling access to said computing system;
   generating by said computing system, a first hash (H1) for said user password;
   storing said first hash (H1) within said computer usable medium;
   generating by said computing system, a second hash (H2) for a system parameter, wherein said system parameter consists of a parameter for a hardware component of said computing system;
   storing said second hash (H2) within said computer usable medium;
   generating by said computing system, an additional hash for only an additional system parameter, wherein said additional system parameter consists of a parameter for a software component of said computing system;
   performing by said computing system, an operation relating said first hash (H1) to said second hash (H2) and said additional hash to generate a first combination value;
   generating by said computing system, a third hash (H3) for said first combination value;
   storing within said computer usable medium, said third hash (H3);
   receiving by said computing system, a specific password for requesting access to said computing system;
   generating by said computing system, a fourth hash (H4) for said specific password;
   performing by said computing system, an operation relating said fourth hash (H4) to said second hash (H2) and said additional hash to generate a second combination value; and
   generating by a computer processor of said computing system, a fifth hash (H5) for said second combination value;
   comparing by said computing system, said third hash (H3) to said fifth hash (H5);
   Determining as a result of said comparing, that said third hash (H3) matches said fifth hash (H5); and
   Enabling access to said computing system.

32. The process of claim 31, wherein said method further comprises:
   comparing by said computing system, said third hash (H3) to said fifth hash (H5);
   determining as a result of said comparing, that said third hash (H3) does not match said fifth hash (H5); and
   denying access to said computing system.

33. The process of claim 31, wherein said method further comprises:
   encrypting by said computing system, said third hash (H3) to generate an encrypted third hash; and
   encrypting by said computing system, said fifth hash (H5) to generate an encrypted fifth hash.

34. The process of claim 33, wherein said method further comprises:
   comparing by said computing system, said encrypted third hash to said encrypted fifth hash;
   determining as a result of said comparing, that said encrypted third hash matches said encrypted fifth hash; and
   enabling access to said computing system.

35. The process of claim 33, wherein said method further comprises:
   comparing by said computing system, said encrypted third hash to said encrypted fifth hash;
   determining as a result of said comparing, that said encrypted third hash does not match said encrypted fifth hash; and
   denying access to said computing system.

36. The process of claim 31, wherein said performing said operation relating said first hash (H1) to said second hash (H2) comprises XORing said first hash (H1) and said second hash (H2) to form H1 XOR H2 as said first combination value.

37. The process of claim 31, wherein said performing said operation relating said first hash (H1) to said second hash (H2) comprises concatenating said first hash (H1) to said second hash (H2) to form H1H2 as said first combination value.

38. The process of claim 31, wherein said performing said operation relating said first hash (H1) to said second hash (H2) comprises concatenating said first hash (H1) to said second hash (H2) to form H2H1 as said first combination value.

39. The process of claim 31, wherein said generating said first hash (H1) comprises applying as an input to a first hash function said user password to generate said first hash (H1), wherein said generating said second hash (H2) comprises applying as an input to a second hash function said system parameter to generate said second hash (H2), wherein said generating said third hash (H3) comprises applying as an input to a third hash function said first combination value to generate said third hash (H3), and wherein said generating said additional hash comprises applying as an input to an additional hash function said additional system parameter to generate said additional hash.

40. The process of claim 39, wherein said first hash function, said second hash function, said additional hash function and said third hash function each comprise a different hash function.

41. The method of claim 1, wherein said system parameter comprises a serial number for said hardware component, and wherein said hardware component comprises a component selected from the group consisting of a central processing unit and a memory device.

42. The method of claim 1, wherein said additional system parameter comprises a specified number for said hardware component, and wherein said software component comprises a component selected from the group consisting of serial/license number for an operating system running said computing system, a daughter card, and a message authentication code (MAC) address for said computing system.

43. The method of claim 1, further comprising:
before said generating said second hash (H2), automatically retrieving by said computing system, said system parameter; and
before said generating said additional hash (H3), automatically retrieving by said computing system, said additional system parameter.

44. The computing system of claim 11, wherein said system parameter comprises a serial number for said hardware component, and wherein said hardware component comprises a component selected from the group consisting of a central processing unit and a memory device.

45. The computing system of claim 11, wherein said additional system parameter comprises a specified number for said software component, and wherein said software component comprises a component selected from the group consisting of serial/license number for an operating system running said computing system, a daughter card, and a message authentication code (MAC) address for said computing system.

46. The computer program product of claim 21, wherein said system parameter comprises a serial number for said hardware component, and wherein said hardware component comprises a component selected from the group consisting of a central processing unit and a memory device.

47. The computer program product of claim 21, wherein said additional system parameter comprises a specified number for said software component, and wherein said software component comprises a component selected from the group consisting of serial/license number for an operating system running said computing system, a daughter card, and a message authentication code (MAC) address for said computing system.

48. The process of claim 31, wherein said system parameter comprises a serial number for said hardware component, and wherein said hardware component comprises a component selected from the group consisting of a central processing unit and a memory device.

49. The process of claim 31, wherein said additional system parameter comprises a specified number for said software component, and wherein said software component comprises a component selected from the group consisting of serial/license number for an operating system running said computing system, a daughter card, and a message authentication code (MAC) address for said computing system.

* * * * *